United States Patent
Kang et al.

(10) Patent No.: US 9,645,445 B2
(45) Date of Patent: May 9, 2017

(54) LIQUID CRYSTAL DISPLAY

(71) Applicant: Shenzhen China Star Optoelectronics Technology Co., Ltd., Shenzhen (CN)

(72) Inventors: Chihtsung Kang, Shenzhen (CN); Bo Hai, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 20 days.

(21) Appl. No.: 13/813,456

(22) PCT Filed: Jan. 22, 2013

(86) PCT No.: PCT/CN2013/070843
§ 371 (c)(1),
(2) Date: Jan. 31, 2013

(87) PCT Pub. No.: WO2014/110839
PCT Pub. Date: Jul. 24, 2014

(65) Prior Publication Data
US 2015/0309369 A1    Oct. 29, 2015

(30) Foreign Application Priority Data
Jan. 18, 2013    (CN) .......................... 2013 1 0019475

(51) Int. Cl.
*G02F 1/13363*    (2006.01)
*G02B 5/30*    (2006.01)
*G02F 1/1335*    (2006.01)

(52) U.S. Cl.
CPC ....... *G02F 1/133634* (2013.01); *G02B 5/305* (2013.01); *G02B 5/3083* (2013.01);
(Continued)

(58) Field of Classification Search
None
See application file for complete search history.

(56) References Cited

U.S. PATENT DOCUMENTS

2007/0091229 A1* 4/2007 Jang ................. G02F 1/133528
                                                         349/96
2009/0040451 A1* 2/2009 Suzuki ...................... C08J 5/18
                                                         349/183

(Continued)

FOREIGN PATENT DOCUMENTS

CN    102866537 A    1/2013
CN    102879954 A    1/2013
(Continued)

*Primary Examiner* — Anthony J Frost
(74) *Attorney, Agent, or Firm* — Mark M. Friedman

(57) ABSTRACT

Disclosed is a liquid crystal display. The liquid crystal display comprises a first polarizer, a liquid crystal layer and a second polarizer. The liquid crystal layer is disposed between the first polarizer and the second polarizer. The present invention solves the problem that the dark-state light leakage is serious in the area near the horizontal viewing angle in the conventional liquid crystal display with a single-layer biaxial compensation architecture by adjusting compensation values of a biaxial layer of the first polarizer and a compensation value of a TAC layer of the second polarizer.

9 Claims, 5 Drawing Sheets

(52) U.S. Cl.
CPC .. *G02F 1/133528* (2013.01); *B32B 2457/202* (2013.01); *G02F 2001/133638* (2013.01)

(56) References Cited

U.S. PATENT DOCUMENTS

| | | | |
|---|---|---|---|
| 2009/0207355 A1* | 8/2009 | Yanai | G02F 1/133634 349/119 |
| 2014/0098328 A1 | 4/2014 | Kang et al. | |
| 2014/0098329 A1 | 4/2014 | Kang | |

FOREIGN PATENT DOCUMENTS

| | | |
|---|---|---|
| CN | 102884661 A | 1/2013 |
| JP | 2008225283 A | 9/2008 |
| WO | 2006054695 A1 | 5/2006 |

* cited by examiner

LIQUID CRYSTAL DISPLAY

BACKGROUND OF THE INVENTION

1. Field of the Invention

The present invention generally relates to a liquid crystal display field, and more particularly to a liquid crystal display with a single-layer biaxial compensation architecture.

2. Description of Prior Art

With an increased viewing angle of a thin film transistor liquid crystal display (TFT-LCD), a contrast ratio of an image is decreased and clarity of the image is decreased as well. This is because a birefringence of liquid crystal molecules in a liquid crystal layer is changed with the changed viewing angle. A wide viewing angle compensation film can be used for reducing dark-state light leakage of the image, thereby increasing the contrast ratio of the image in a specific viewing angle significantly. In general, a compensation principle of the compensation film is to correct phase differences of the liquid crystal molecules at different viewing angles, such that the birefringence characteristic is compensated symmetrically.

For different liquid crystal display modes, different compensation films are utilized. A compensation film for a large-sized liquid crystal display is mostly utilized for a vertical alignment (VA) display mode. Please refer to FIG. 1. FIG. 1 shows a liquid crystal display with a single-layer biaxial compensation architecture in the prior arts. The liquid crystal display comprises a first triacetyl cellulose (hereinafter referred to as "TAC") layer 100, a first poly vinyl alcohol (hereinafter referred to as "PVA") layer 102, a first biaxial layer 104, a first pressure sensitive adhesive (hereinafter referred to as "PSA") layer 106, a liquid crystal layer 120, a second PSA layer 140, a second TAC layer 142, a second PVA layer 144 and a third TAC layer 146. The liquid crystal display utilizes one biaxial layer (i.e. the first biaxial layer 104) for compensation and thus is called as a single-layer biaxial compensation architecture.

It can be known in accordance with tests that when the single-layer biaxial compensation architecture is utilized, a viewing angle at which the dark-state light leakage is serious is near a horizontal viewing angle. That is, the light leakage is concentrated between 20 degrees and 40 degrees, 140 degrees and 160 degrees, 200 degrees and 220 degrees, and 310 degrees and 330 degrees. An area near the horizontal viewing angle is easily seen by an observer, and thus the contrast ratio in the area near the horizontal viewing angle affects viewing effect most. An area near a vertical viewing angle is not easily seen by the observer, and thus the viewing effect is affected less. With the enlarged size of the liquid crystal display, the above-mentioned phenomena are more obvious. Accordingly, it is necessary to limit the area having the dark-state light leakage to the area near the vertical viewing angle instead of the area near the horizontal viewing angle in the prior arts.

Please refer to FIG. 2. FIG. 2 shows a liquid crystal display with a two-layer biaxial compensation architecture in the prior arts. The liquid crystal display comprises a TAC layer 200, a first PVA layer 202, a first biaxial layer 204, a first PSA layer 206, a liquid crystal layer 220, a second PSA layer 240, a second PSA layer 240, a second biaxial layer 242, a second PVA layer 244 and a third TAC layer 246. The liquid crystal display utilizes two biaxial layers (i.e. the first biaxial layer 204 and the second biaxial layer 242) for compensation and thus is called as a two-layer biaxial compensation architecture. When the two-layer biaxial compensation architecture as shown in FIG. 2 is utilized, the dark-state light leakage is at a viewing angle between the horizontal viewing angle and the vertical viewing angle. Although the dark-state light leakage is better than that in the single-layer biaxial compensation architecture in FIG. 1, the cost of the two-layer biaxial compensation architecture in FIG. 2 is expensive and the improved effect is limited.

Consequently, when the single-layer biaxial compensation architecture in FIG. 1 is utilized under cost consideration, there is a need to solve the problem that the dark-state light leakage is serious in the area near the horizontal viewing angle in the conventional single-layer biaxial compensation architecture.

SUMMARY OF THE INVENTION

An objective of the present invention is to provide a liquid crystal display which is capable of solving the problem that the dark-state light leakage is serious in the area near the horizontal viewing angle in the conventional single-layer biaxial compensation architecture.

To solve the above-mentioned problem, a liquid crystal display provided by the present invention comprises a first polarizer, a liquid crystal layer and a second polarizer. The liquid crystal layer is disposed between the first polarizer and the second polarizer. The first polarizer comprises a first triacetyl cellulose layer, a first poly vinyl alcohol layer, a first biaxial layer and a first substrate. The first poly vinyl alcohol layer is disposed on the first triacetyl cellulose layer. The first biaxial layer is disposed on the first poly vinyl alcohol layer. The first triacetyl cellulose layer, the first poly vinyl alcohol layer and the first biaxial layer are fixed to the first substrate. The second polarizer comprises a second substrate, a second triacetyl cellulose layer, a second poly vinyl alcohol layer and a third triacetyl cellulose layer. The second poly vinyl alcohol layer is disposed on the second triacetyl cellulose layer. The third triacetyl cellulose layer is disposed on the second poly vinyl alcohol layer. The third triacetyl cellulose layer, the second poly vinyl alcohol layer and the second triacetyl cellulose layer are fixed to the second substrate. When a wavelength is 550 nanometers and a range of a pretilt angle of liquid crystal molecules of the liquid crystal layer is between 85 degrees and 90 degrees, a compensation value Rth1 of the biaxial layer and a range [Y1, Y2] of a compensation value Rth2 of the second triacetyl cellulose layer satisfy the following equations:

$$Y1 = -0.002107 \times (Rth1)^2 - 0.01686 \times (Rth1) + 206.5$$

$$Y2 = -0.006137 \times (Rth1)^2 + 1.703 \times (Rth1) + 75.16.$$

The compensation value Rth1 of the first biaxial layer is a thickness-direction plane retardation of the first biaxial layer. The compensation value Rth2 of the second triacetyl cellulose layer is a thickness-direction plane retardation of the second triacetyl cellulose layer. Y1 is a minimum value of the compensation value Rth2 of the second triacetyl cellulose layer, and Y2 is a maximum value of the compensation value Rth2 of the second triacetyl cellulose layer. When the compensation value Rth1 of the first biaxial layer is selected as a first predetermined value, the minimum value Y1 and the maximum value Y2 of the compensation value Rth2 of the second triacetyl cellulose layer are obtained from the above-mentioned equations, the compensation value Rth2 of the second triacetyl cellulose layer is selected as a second predetermined value which is ranged between the minimum value Y1 and the maximum value Y2, and the first predetermined value satisfies the following equation:

$$Rth1 = [(Nx1 - Ny1)/2 - Nz1] \times d1.$$

Two directions perpendicular to each other on a plane of the biaxial layer are respectively defined as an X axis and a Y-axis. A direction perpendicular to a thickness direction of the first biaxial layer is defined as a Z axis. $Nx1$ is a refractive index of the first biaxial layer in a direction of the X axis. $Ny1$ is a refractive index of the first biaxial layer in a direction of the Y axis. $Nz1$ is a refractive index of the first biaxial layer in a direction of the Z axis. $d1$ is a thickness of the first biaxial layer.

The second predetermined value satisfies the following equation:

$$Rth2=[(Nx2-Ny2)/2-Nz2]\times d2.$$

Two directions perpendicular to each other on a plane of the second triacetyl cellulose layer are respectively defined as an X axis and a Y-axis. A direction perpendicular to a thickness direction of the second triacetyl cellulose layer is defined as a Z axis. $Nx2$ is a refractive index of the second triacetyl cellulose layer in a direction of the X axis. $Ny1$ is a refractive index of the second triacetyl cellulose layer in a direction of the Y axis. $Nz1$ is a refractive index of the second triacetyl cellulose layer in a direction of the Z axis. $d2$ is a thickness of the second triacetyl cellulose layer.

In the liquid crystal display of the present invention, when the compensation value $Rth1$ of the first biaxial layer is selected as the first predetermined value, a compensation value $Ro$ of the first biaxial layer corresponds to the compensation value $Rth1$ and satisfies the following equation:

$$Ro=(Nx1-Ny1)\times d1.$$

The compensation value $Ro$ is a planar retardation of the first biaxial layer.

In the liquid crystal display of the present invention, a preferred range of the compensation value $Rth1$ of the biaxial layer is between 180 nanometers and 280 nanometers.

In the liquid crystal display of the present invention, a preferred range of an optical path difference of the liquid crystal layer is between 342.8 nanometers and 361.4 nanometers.

To solve the above-mentioned problem, the present invention further provides a liquid crystal display, which comprises a first polarizer, a liquid crystal layer and a second polarizer. The liquid crystal layer is disposed between the first polarizer and the second polarizer. The first polarizer comprises a first triacetyl cellulose layer, a first poly vinyl alcohol layer, a first biaxial layer and a first substrate. The first poly vinyl alcohol layer is disposed on the first triacetyl cellulose layer. The first biaxial layer is disposed on the first poly vinyl alcohol layer. The first triacetyl cellulose layer, the first poly vinyl alcohol layer and the first biaxial layer are fixed to the first substrate. The second polarizer comprises a second substrate, a second triacetyl cellulose layer, a second poly vinyl alcohol layer and a third triacetyl cellulose layer. The second poly vinyl alcohol layer is disposed on the second triacetyl cellulose layer. The third triacetyl cellulose layer is disposed on the second poly vinyl alcohol layer. The third triacetyl cellulose layer, the second poly vinyl alcohol layer and the second triacetyl cellulose layer are fixed to the second substrate. When a wavelength is 550 nanometers, a compensation value $Rth1$ of the biaxial layer and a range [$Y1$, $Y2$] of a compensation value $Rth2$ of the second triacetyl cellulose layer satisfy the following equations:

$$Y1=-0.002107\times (Rth1)^2-0.01686\times (Rth1)+206.5$$

$$Y2=-0.006137\times (Rth1)^2+1.703\times (Rth1)+75.16.$$

The compensation value $Rth1$ of the first biaxial layer is a thickness-direction plane retardation of the first biaxial layer. The compensation value $Rth2$ of the second triacetyl cellulose layer is a thickness-direction plane retardation of the second triacetyl cellulose layer. $Y1$ is a minimum value of the compensation value $Rth2$ of the second triacetyl cellulose layer, and $Y2$ is a maximum value of the compensation value $Rth2$ of the second triacetyl cellulose layer. When the compensation value $Rth1$ of the first biaxial layer is selected as a first predetermined value, the minimum value $Y1$ and the maximum value $Y2$ of the compensation value $Rth2$ of the second triacetyl cellulose layer are obtained from the above-mentioned equations, the compensation value $Rth2$ of the second triacetyl cellulose layer is selected as a second predetermined value which is ranged between the minimum value $Y1$ and the maximum value $Y2$, and the first predetermined value satisfies the following equation:

$$Rth1=[(Nx1-Ny1)/2-Nz1]\times d1.$$

Two directions perpendicular to each other on a plane of the biaxial layer are respectively defined as an X axis and a Y-axis. A direction perpendicular to a thickness direction of the first biaxial layer is defined as a Z axis. $Nx1$ is a refractive index of the first biaxial layer in a direction of the X axis. $Ny1$ is a refractive index of the first biaxial layer in a direction of the Y axis. $Nz1$ is a refractive index of the first biaxial layer in a direction of the Z axis. $d1$ is a thickness of the first biaxial layer.

The second predetermined value satisfies the following equation:

$$Rth2=[(Nx2-Ny2)/2-Nz2]\times d2.$$

Two directions perpendicular to each other on a plane of the second triacetyl cellulose layer are respectively defined as an X axis and a Y-axis. A direction perpendicular to a thickness direction of the second triacetyl cellulose layer is defined as a Z axis. $Nx2$ is a refractive index of the second triacetyl cellulose layer in a direction of the X axis. $Ny1$ is a refractive index of the second triacetyl cellulose layer in a direction of the Y axis. $Nz1$ is a refractive index of the second triacetyl cellulose layer in a direction of the Z axis. $d2$ is a thickness of the second triacetyl cellulose layer.

In the liquid crystal display of the present invention, when the compensation value $Rth1$ of the first biaxial layer is selected as the first predetermined value, a compensation value $Ro$ of the first biaxial layer corresponds to the compensation value $Rth1$ and satisfies the following equation:

$$Ro=(Nx1-Ny1)\times d1.$$

The compensation value $Ro$ is a planar retardation of the first biaxial layer.

In the liquid crystal display of the present invention, a preferred range of the compensation value $Rth1$ of the biaxial layer is between 180 nanometers and 280 nanometers.

In the liquid crystal display of the present invention, a preferred range of an optical path difference of the liquid crystal layer is between 342.8 nanometers and 361.4 nanometers.

To solve the above-mentioned problem, the present invention further provides a liquid crystal display, which comprises a first polarizer, a liquid crystal layer and a second polarizer. The liquid crystal layer is disposed between the first polarizer and the second polarizer. The first polarizer comprises a first triacetyl cellulose layer, a first poly vinyl alcohol layer, a first biaxial layer and a first substrate. The first poly vinyl alcohol layer is disposed on the first triacetyl cellulose layer. The first biaxial layer is disposed on the first poly vinyl alcohol layer. The first triacetyl cellulose layer, the first poly vinyl alcohol layer and the first biaxial layer are fixed to the first substrate. The second polarizer comprises a second substrate, a second triacetyl cellulose layer, a second poly vinyl alcohol layer and a third triacetyl cellulose layer. The second poly vinyl alcohol layer is disposed on the second triacetyl cellulose layer. The third triacetyl cellulose layer is disposed on the second poly vinyl alcohol layer. The third triacetyl cellulose layer, the second poly vinyl alcohol layer and the second triacetyl cellulose layer are fixed to the second substrate. When a wavelength is 550 nanometers, a compensation value Rth1 of the biaxial layer and a range [Y1, Y2] of a compensation value Rth2 of the second triacetyl cellulose layer satisfy the following equations:

$$Y1=-0.002107\times(Rth1)^2-0.01686\times(Rth1)+206.5$$

$$Y2=-0.006137\times(Rth1)^2+1.703\times(Rth1)+75.16.$$

The compensation value Rth1 of the first biaxial layer is a thickness-direction plane retardation of the first biaxial layer. The compensation value Rth2 of the second triacetyl cellulose layer is a thickness-direction plane retardation of the second triacetyl cellulose layer. Y1 is a minimum value of the compensation value Rth2 of the second triacetyl cellulose layer, and Y2 is a maximum value of the compensation value Rth2 of the second triacetyl cellulose layer.

In the liquid crystal display of the present invention, a preferred range of the compensation value Rth1 of the biaxial layer is between 180 nanometers and 280 nanometers.

In the liquid crystal display of the present invention, a preferred range of an optical path difference of the liquid crystal layer is between 342.8 nanometers and 361.4 nanometers.

In the liquid crystal display of the present invention, a preferred range of a pretilt angle of liquid crystal molecules of the liquid crystal layer is between 85 degrees and 90 degrees.

Comparing with the conventional liquid crystal display, the liquid crystal display of the present invention is capable of solving the problem that the dark-state light leakage is serious in the area near the horizontal viewing angle in the single-layer biaxial compensation architecture.

For a better understanding of the aforementioned content of the present invention, preferable embodiments are illustrated in accordance with the attached figures for further explanation:

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

In the appended figures, elements having similar structures are represented as the same numeral.

Figure 1:
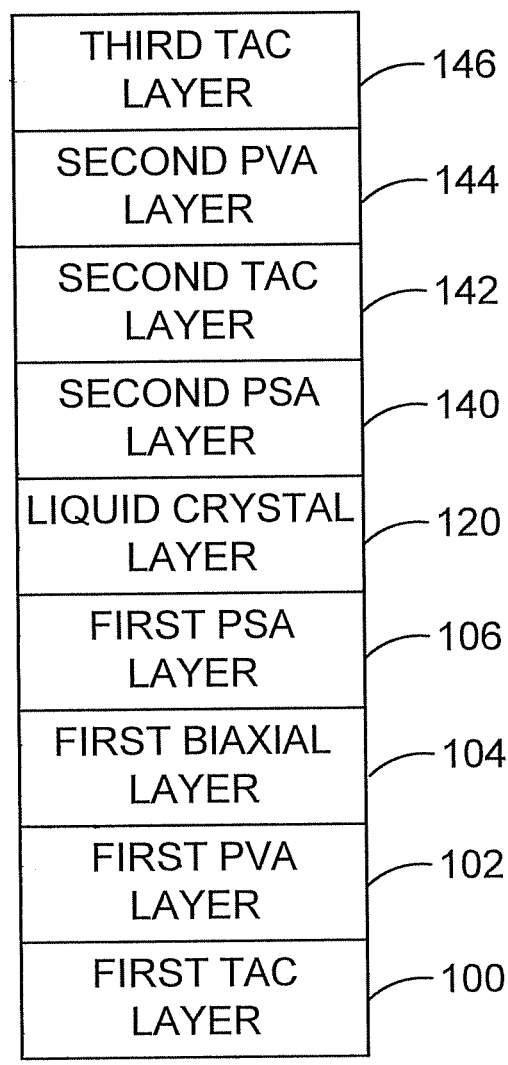
FIG. 1 shows a liquid crystal display with a single-layer biaxial compensation architecture in the prior arts.
Figure 2:
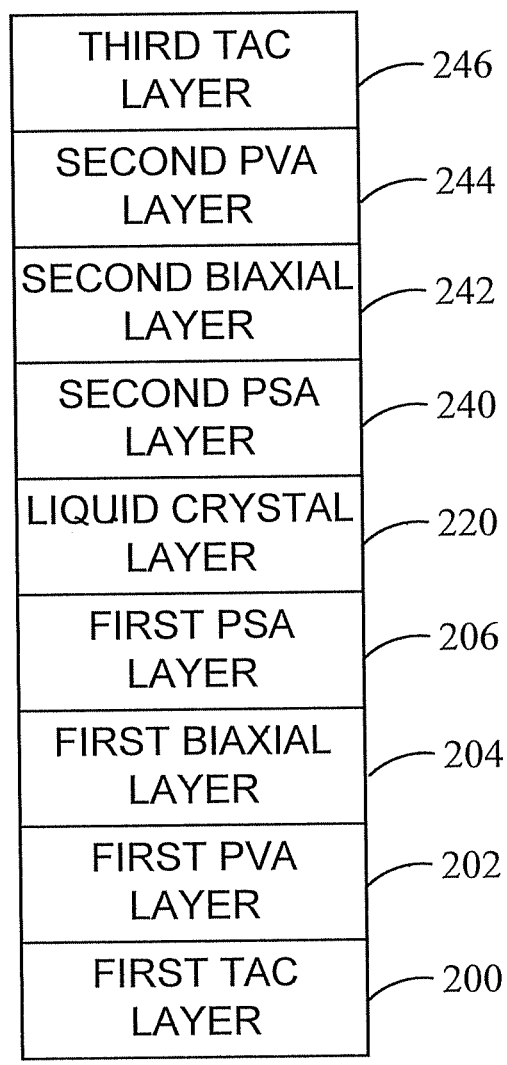
FIG. 2 shows a liquid crystal display with a two-layer biaxial compensation architecture in the prior arts.
Figure 3:
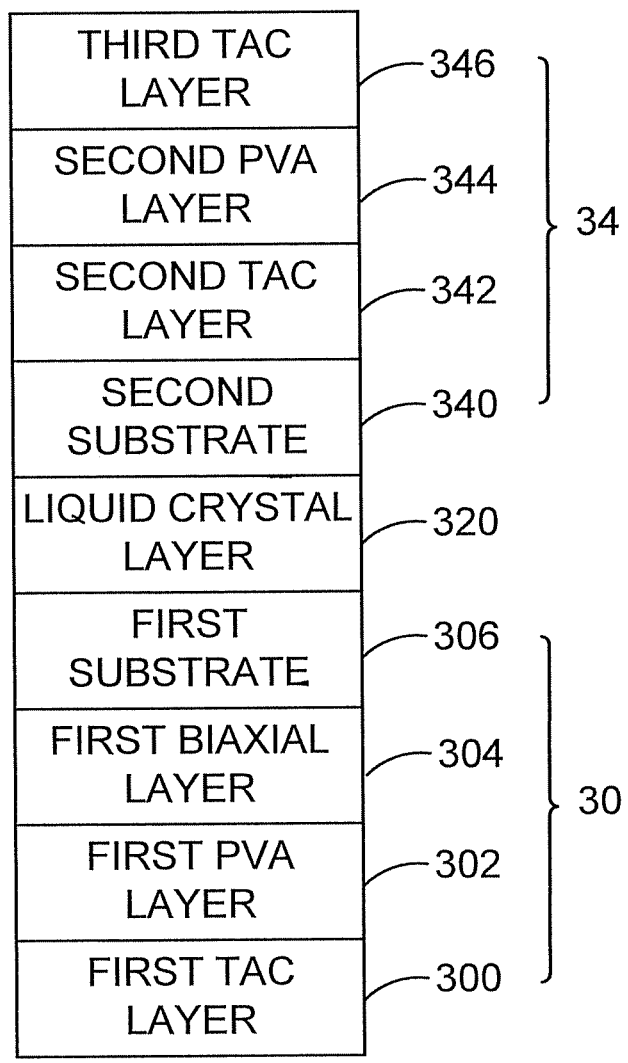
FIG. 3 shows a liquid crystal display according to an embodiment of the present invention.

Please refer to FIG. 3. FIG. 3 shows a liquid crystal display according to an embodiment of the present invention.

The liquid crystal display comprises a first polarizer 30, a liquid crystal layer 320 and a second polarizer 34. The liquid crystal layer 320 is disposed between the first polarizer 30 and the second polarizer 34.

The first polarizer 30 comprises a first TAC layer 300, a first PVA layer 302, a first biaxial layer 304 and a first substrate 306. The first PVA layer 302 is disposed on the first TAC layer 300. The first biaxial layer 304 is disposed on the first PVA layer 302. The first substrate 306 is a PSA layer. The first TAC layer 300, the first PVA layer 302 and the first biaxial layer 304 are fixed to the first substrate 306.

The second polarizer 34 comprises a second substrate 340, a second TAC layer 342, a second PVA layer 344 and a third TAC layer 346. The second PVA layer 344 is disposed on the second TAC layer 342. The third TAC layer 346 is disposed on the second PVA layer 344. The second substrate 340 is a PSA layer. The third TAC layer 346, the second PVA layer 344 and the second TAC layer are fixed to the second substrate 340.

More particularly, the liquid crystal layer 320 is disposed between the first substrate 306 and the second substrate 340.

The liquid crystal display of the present invention utilizes one biaxial layer (i.e. the first biaxial layer 304) and thus is a single-layer biaxial compensation architecture. In order to solve the problem that the dark-state light leakage is serious in the area near the horizontal viewing angle in the prior arts, the present invention executes tests and experiments continuously. Finally, the present solves the above-mentioned problem by adjusting a compensation value of the first biaxial layer 304 and a compensation value of the second TAC layer 342. The setting of each layer in FIG. 3 is as follows: a slow axis of the first TAC layer 300 is set as 0 degree, an absorption axis of the first PVA layer 302 is set as 90 degrees, a slow axis of the first biaxial layer 304 is set as 0 degree, a slow axis of the second TAC layer 342 is set as 90 degrees, an absorption axis of the second PVA layer 344 is set as 0 degree, and a slow axis of the third TAC layer 346 is set as 90 degrees. The above-mentioned degrees are referred to as phi degrees.

Figure 4:
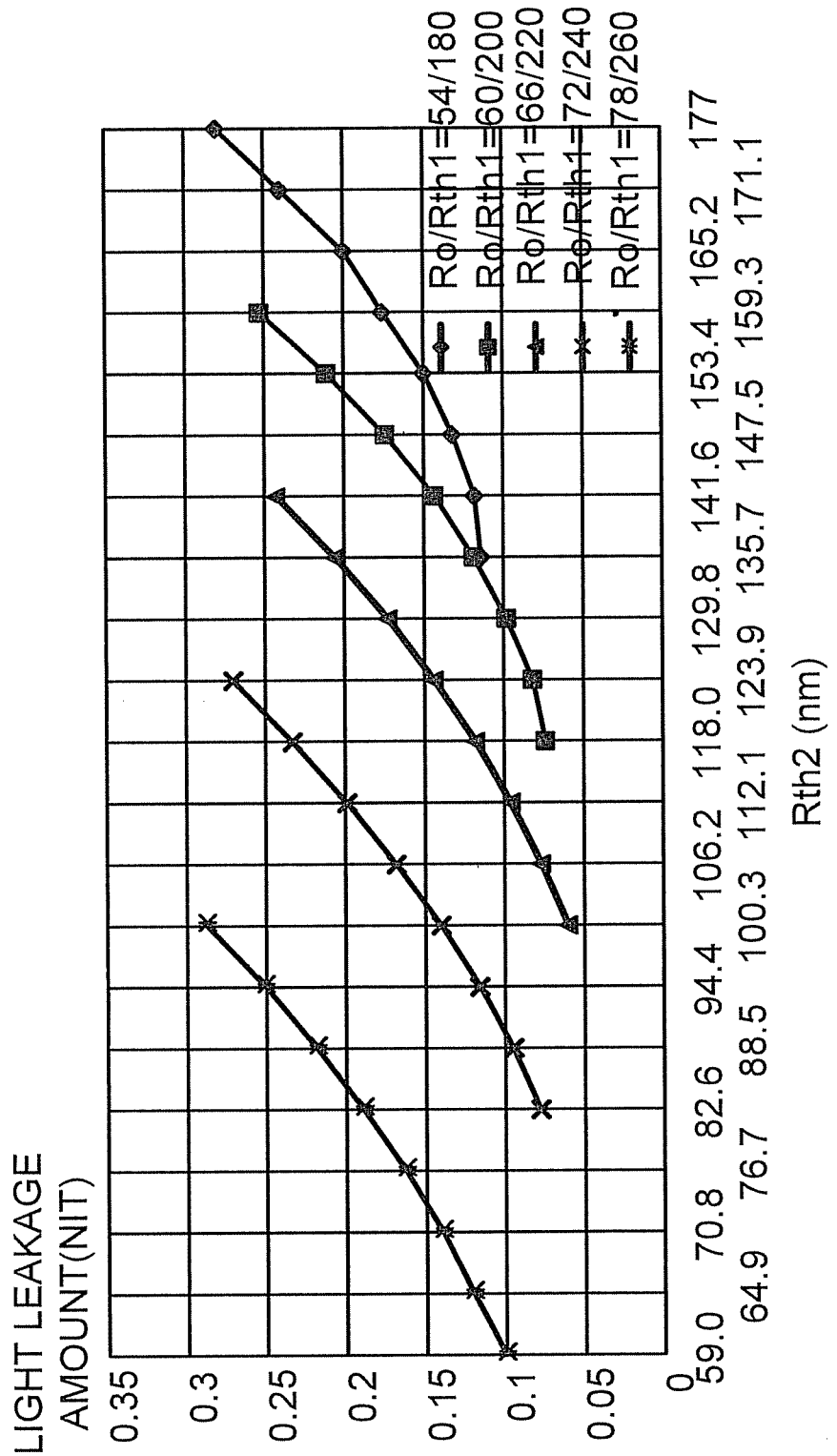
FIG. 4 shows relationships among dark-state light leakage amounts, compensation values of a first biaxial layer and compensation values of a second TAC layer when an optical path difference of a liquid crystal layer in FIG. 3 is 342.8 nanometers.
Figure 5:
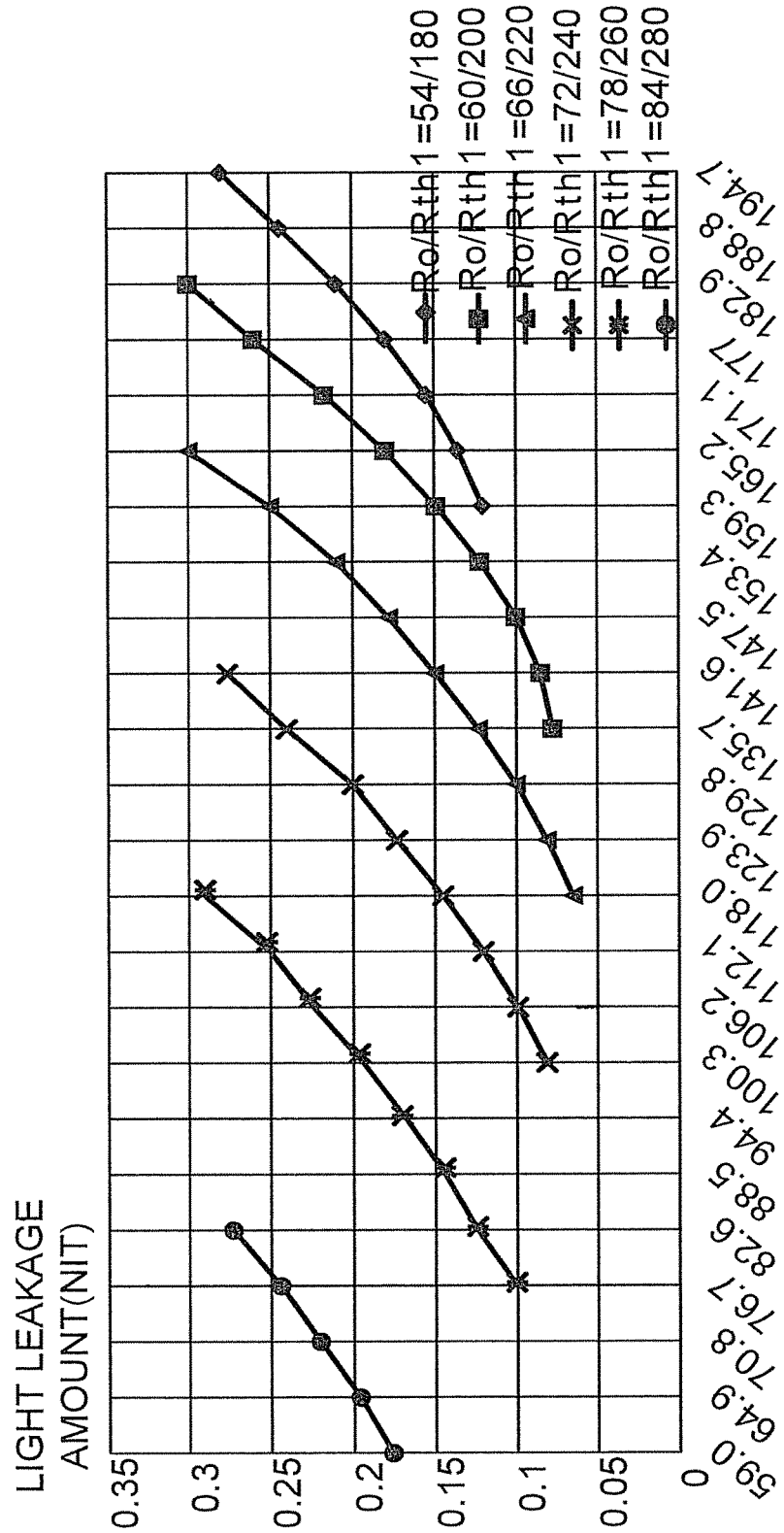
FIG. 5 shows relationships among the dark-state light leakage amounts, the compensation values of the first biaxial layer and the compensation values of the second TAC layer when the optical path difference of the liquid crystal layer in FIG. 3 is 361.4 nm.

Please refer to FIG. 4 and FIG. 5. FIG. 4 shows relationships among dark-state light leakage amounts, the compensation values of the first biaxial layer 304 and the compensation values of the second TAC layer 342 when an optical path difference ($\Delta nd$) of the liquid crystal layer 320 in FIG. 3 is 342.8 nanometers (nm). FIG. 5 shows relationships among the dark-state light leakage amounts, the compensation values of the first biaxial layer 304 and the compensation values of the second TAC layer 342 when the optical path difference ($\Delta nd$) of the liquid crystal layer 320 in FIG. 3 is 361.4 nm. After the present invention is tested, it can be known that a trend that the compensation value of the first biaxial layer 304 affects the dark-state light leakage is the same as a trend that the compensation value of the second TAC layer 342 affects the dark-state light leakage when the liquid crystal molecules of the liquid crystal 320 are under different pretilt angles. That is, ranges between the dark-state light leakage amounts and the corresponding compensation values at different pretilt angles are the same.

The above-mentioned compensation value of the first biaxial layer 304 comprises a planar retardation (hereinafter referred to as "Ro") and a thickness-direction plane retardation (hereinafter referred to as "Rth1"), while the compensation value of second TAC layer 342 is a thickness-direction plane retardation (hereinafter referred to as "Rth2"). The above-mentioned compensation values are known for one skilled in the art of the present invention and not repeated herein.

According to unceasing tests, the present invention obtains the compensation value Rth1 of the first biaxial layer 304 and a range [Y1, Y2] of the compensation value Rth2 of the second TAC layer 342 are necessary to satisfy the following equations (1) and (2):

$$Y1=-0.002107\times(Rth1)^2-0.01686\times(Rth1)+206.5 \quad (1)$$

$$Y2=-0.006137\times(Rth1)^2+1.703\times(Rth1)+75.16 \quad (2)$$

For instance, when the pretilt angle is ranged between [85 degrees, 90 degrees], the compensation value Rth1 of the first biaxial layer 304 is selected and then the range [Y1, Y2] of the second TAC layer 342 may be obtained by the above-mentioned equations (1) and (2). Y1 is a minimum value of the compensation value Rth2 of the second TAC layer 342, and Y2 is a maximum value of the compensation value Rth2 of the second TAC layer 342. Then, the compensation value Ro corresponding to the selected compensation value Rth1 of the first biaxial layer 304 may be obtained from FIG. 4 (or FIG. 5). The present invention is capable of solving the problem that the dark-state light leakage is serious in the area near the horizontal viewing angle in the conventional single-layer biaxial compensation architecture, such that the dark-light light leakage is in the area near the vertical viewing angle and concentrated in a narrower viewing range and the light leakage amount is reduced significantly.

A preferred embodiment of the present invention will be described in the following after tests. In the preferred embodiment, the pretilt angel is [85 degrees, 90 degrees], and the optical path difference ($\Delta nd$) of the liquid crystal layer 320 is [342.8 nm, 361.4 nm]. After the tests, a preferred range of the compensation value Rth1 of the biaxial layer 304 is between [180 nm, 280 nm]. After the compensation value Rth1 of the first biaxial layer 304 is selected as a first predetermined value which is ranged between 180 nm and 280 nm, a corresponding range of the compensation value Rth2 of the second TAC layer 342 may be obtained from the above-mentioned equations (1) and (2). Then, the compensation value Ro corresponding to the selected compensation value Rth1 of the biaxial layer 304 may be obtained from FIG. 4 (or FIG. 5).

For instance, when the optical path difference ($\Delta nd$) of the liquid crystal layer 320 is selected as 352.1 nm and the pretilt angel is 89 degrees, the compensation value Rth1 of the first biaxial layer 304 is assumed to be selected as 220 nm (i.e. the first predetermined value is 220 nm). The compensation value Ro corresponding to the compensation value Rth1 (i.e. 220 nm) of the first biaxial layer 304 may be selected as 66 nm according to FIG. 4 (or FIG. 5). The range [Y1, Y2]≅[100.81 nm, 152.79 nm] of the compensation value Rth2 may be obtained from the above-mentioned equations (1) and (2). The compensation value Rth2 of the second TAC layer 342 is selected as a second predetermined value (e.g. the second predetermined value is 118 nm). According to the above-mentioned selections of the compensation values, the liquid crystal display of the present invention is capable of solving the problem that the dark-state light leakage is serious in the area near the horizontal viewing angle in the conventional single-layer biaxial compensation architecture and the light leakage amount may be reduced to be lower than 0.2 nits (a simulation value). As a result, the area of the dark-state light leakage is concentrated near the vertical viewing angle and concentrated in the narrower viewing angle range, and the light leakage is reduced significantly. Furthermore, the contrast ratios in all viewing angles are better than the contrast ratios in all viewing angles in the prior arts, and a minimum value of the contrast ratios in all viewing angles triples that of the contrast ratios in all viewing angles in the prior arts.

The above-mentioned first predetermined value satisfies the following equation (3).

$$Rth1=[(Nx1-Ny1)/2-Nz1]\times d1 \quad (3)$$

Two directions perpendicular to each other on a plane of the biaxial layer 304 are respectively defined as an X axis and a Y-axis, and a direction perpendicular to a thickness direction of the first biaxial layer 304 is defined as a Z axis. Nx1 is a refractive index of the first biaxial layer 304 in a direction of the X axis, Ny1 is a refractive index of the first biaxial layer 304 in a direction of the Y axis, Ny1 is a refractive index of the first biaxial layer 304 in a direction of the Z axis, and d1 is a thickness of the first biaxial layer 304.

Furthermore, the second predetermined value satisfies the following equation (4).

$$Rth2=[(Nx2-Ny2)/2-Nz2]\times d2 \quad (4)$$

Two directions perpendicular to each other on a plane of the second TAC layer 342 are respectively defined as an X axis and a Y-axis, and a direction perpendicular to a thickness direction of the second TAC layer 342 is defined as a Z axis. Nx2 is a refractive index of the second TAC layer 342 in a direction of the X axis, Ny2 is a refractive index of the second TAC layer 342 in a direction of the Y axis, Nx2 is a refractive index of the second TAC layer 342 in a direction of the Z axis, and d2 is a thickness of the second TAC layer 342.

As mentioned above, when the compensation value Rth1 of the first biaxial layer 304 is selected as the first predetermined value, the corresponding compensation value Ro of the first biaxial layer 304 satisfies the following equation (5).

$$Ro=(Nx1-Ny1)\times d1 \quad (5)$$

After the compensation value Ro of the first biaxial layer 304, the compensation value of the first biaxial layer 304 and the compensation value Rth2 of the second TAC layer 342 are selected, the compensation value Ro of the first biaxial layer 304, the compensation value of the first biaxial layer 304 and the compensation value Rth2 of the second TAC layer 342 may be reached by the following three methods according to the above-mentioned equations (3)~(5). In a first method, the refractive indices Nx1 and Nx2 in the direction of the X axis, the refractive indices Ny1 and Ny2 in the direction of the Y axis, and the refractive indices Nz1 and Nz2 in the direction of the Z axis are constant, and the thicknesses d1 and d2 are adjusted for reaching the necessary compensation value Ro of the first biaxial layer 304, the compensation value of the first biaxial layer 304 and the compensation value Rth2 of the second TAC layer 342. In a second method, the thicknesses d1 and d2 are constant, and the refractive indices Nx1 and Nx2 in the direction of the X axis, the refractive indices Ny1 and Ny2 in the direction of the Y axis, and the refractive indices Nz1 and Nz2 in the direction of the Z axis are adjusted for reaching the necessary compensation value Ro of the first biaxial layer 304, the compensation value of the first biaxial layer 304 and the compensation value Rth2 of the second TAC layer 342. In a third method, the refractive indices Nx1 and Nx2 in the direction of the X axis, the refractive indices Ny1 and Ny2 in the direction of the Y axis, the refractive indices Nz1 and Nz2 in the direction of the Z axis and the thicknesses d1 and d2 are adjusted for reaching the necessary compensation value Ro of the first biaxial layer 304, the compensation value of the first biaxial layer 304 and the compensation value Rth2 of the second TAC layer 342.

The above-mentioned compensation values and the optical path difference ($\Delta$nd) are values corresponding to a wavelength of 550 nm. The present invention provides the ranges of the compensation values, and the ranges are capable of being applied to various compensation films.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A liquid crystal display, comprising a first polarizer, a liquid crystal layer and a second polarizer, the liquid crystal layer disposed between the first polarizer and the second polarizer, the first polarizer comprising a first triacetyl cellulose layer, a first poly vinyl alcohol layer, a first biaxial layer and a first substrate, the first poly vinyl alcohol layer disposed on the first triacetyl cellulose layer, the first biaxial layer disposed on the first poly vinyl alcohol layer, the first triacetyl cellulose layer, the first poly vinyl alcohol layer and the first biaxial layer fixed to the first substrate, the second polarizer comprising a second substrate, a second triacetyl cellulose layer, a second poly vinyl alcohol layer and a third triacetyl cellulose layer, the second poly vinyl alcohol layer disposed on the second triacetyl cellulose layer, the third triacetyl cellulose layer disposed on the second poly vinyl alcohol layer, the third triacetyl cellulose layer, the second poly vinyl alcohol layer and the second triacetyl cellulose layer fixed to the second substrate, wherein only one biaxial layer is utilized in the liquid crystal display;

wherein when a wavelength is 550 nanometers and a range of a pretilt angle of liquid crystal molecules of the liquid crystal layer is between 85 degrees and 90 degrees, a compensation value Rth1 of the biaxial layer and a range [Y1, Y2] of a compensation value Rth2 of the second triacetyl cellulose layer satisfy the following equations (1) and (2):

$$Y1=-0.002107\times(Rth1)^2-0.01686\times(Rth1)+206.5 \quad (1)$$

$$Y2=-0.006137\times(Rth1)^2+1.703\times(Rth1)+75.16 \quad (2)$$

the compensation value Rth1 of the first biaxial layer is a thickness-direction plane retardation of the first biaxial layer, the compensation value Rth2 of the second triacetyl cellulose layer is a thickness-direction plane retardation of the second triacetyl cellulose layer, Y1 is a minimum value of the compensation value Rth2 of the second triacetyl cellulose layer, and Y2 is a maximum value of the compensation value Rth2 of the second triacetyl cellulose layer, when the compensation value Rth1 of the first biaxial layer is selected as a first predetermined value, the minimum value Y1 and the maximum value Y2 of the compensation value Rth2 of the second triacetyl cellulose layer are obtained from the above-mentioned equations (1) and (2), the compensation value Rth2 of the second triacetyl cellulose layer is selected as a second predetermined value which is ranged between the minimum value Y1 and the maximum value Y2, and the first predetermined value satisfies the following equation (3):

$$Rth1=[(Nx1-Ny1)/2-Nz1]\times d1 \quad (3)$$

two directions perpendicular to each other on a plane of the biaxial layer are respectively defined as an X axis and a Y-axis, a direction perpendicular to a thickness direction of the first biaxial layer is defined as a Z axis, Nx1 is a refractive index of the first biaxial layer in a direction of the X axis, Ny1 is a refractive index of the first biaxial layer in a direction of the Y axis, Nz1 is a refractive index of the first biaxial layer in a direction of the Z axis, and d1 is a thickness of the first biaxial layer, the second predetermined value satisfies the following equation (4):

$$Rth2=[(Nx2-Ny2)/2-Nz2]\times d2 \quad (4)$$

two directions perpendicular to each other on a plane of the second triacetyl cellulose layer are respectively defined as an X axis and a Y-axis, a direction perpendicular to a thickness direction of the second triacetyl cellulose layer is defined as a Z axis, Nx2 is a refractive index of the second triacetyl cellulose layer in a direction of the X axis, Ny1 is a refractive index of the second triacetyl cellulose layer in a direction of the Y axis, Nz1 is a refractive index of the second triacetyl cellulose layer in a direction of the Z axis, and d2 is a thickness of the second triacetyl cellulose layer, a slow axis of the first TAC layer is set as U degree, an absorption axis of the first PVA layer is set as 90 degrees, a slow axis of the first, biaxial layer is set as 0 degree, a slow axis of the second TAC layer is set as 90 degrees, an absorption axis of the second PVA layer is set as 0 degree, and a slow axis of the third TAC layer is set as 90 degrees.

2. The liquid crystal display of claim 1, wherein when the compensation value Rth1 of the first biaxial layer is selected as the first predetermined value, a compensation value Ro of the first biaxial layer corresponds to the compensation value Rth1 and satisfies the following equation (5):

$$Ro=(Nx1-Ny1)\times d1 \quad (5)$$

the compensation value Ro is a planar retardation of the first biaxial layer.

3. The liquid crystal display of claim 2, wherein a preferred range of the compensation value Rth1 of the biaxial layer is between 180 nanometers and 280 nanometers.

4. A liquid crystal display, comprising a first polarizer, a liquid crystal layer and a second polarizer, the liquid crystal layer disposed between the first polarizer and the second polarizer, the first polarizer comprising a first triacetyl cellulose layer, a first poly vinyl alcohol layer, a first biaxial layer and a first substrate, the first poly vinyl alcohol layer disposed on the first triacetyl cellulose layer, the first biaxial layer disposed on the first poly vinyl alcohol layer, the first triacetyl cellulose layer, the first poly vinyl alcohol layer and the first biaxial layer fixed to the first substrate, the second polarizer comprising a second substrate, a second triacetyl cellulose layer, a second poly vinyl alcohol layer and a third triacetyl cellulose layer, the second poly vinyl alcohol layer disposed on the second triacetyl cellulose layer, the third triacetyl cellulose layer disposed on the second poly vinyl alcohol layer, the third triacetyl cellulose layer, the second poly vinyl alcohol layer and the second triacetyl cellulose layer fixed to the second substrate, wherein only one biaxial layer is utilized in the liquid crystal display;

wherein when a wavelength is 550 nanometers, a compensation value Rth1 of the biaxial layer and a range [Y1, Y2] of a compensation value Rth2 of the second triacetyl cellulose layer satisfy the following equations (1) and (2):

$$Y1 = -0.002107 \times (Rth1)^2 - 0.01686 \times (Rth1) + 206.5 \quad (1)$$

$$Y2 = -0.006137 \times (Rth1)^2 + 1.703 \times (Rth1) + 75.16 \quad (2)$$

the compensation value Rth1 of the first biaxial layer is a thickness-direction plane retardation of the first biaxial layer, the compensation value Rth2 of the second triacetyl cellulose layer is a thickness-direction plane retardation of the second triacetyl cellulose layer, Y1 is a minimum value of the compensation value Rth2 of the second triacetyl cellulose layer, and Y2 is a maximum value of the compensation value Rth2 of the second triacetyl cellulose layer, when the compensation value Rth1 of the first biaxial layer is selected as a first predetermined value, the minimum value Y1 and the maximum value Y2 of the compensation value Rth2 of the second triacetyl cellulose layer are obtained from the above-mentioned equations (1) and (2), the compensation value Rth2 of the second triacetyl cellulose layer is selected as a second predetermined value which is ranged between the minimum value Y1 and the maximum value Y2, and the first predetermined value satisfies the following equation (3):

$$Rth1 = [(Nx1 - Ny1)/2 - Nz1] \times d1 \quad (3)$$

two directions perpendicular to each other on a plane of the biaxial layer are respectively defined as an X axis and a Y-axis, a direction perpendicular to a thickness direction of the first biaxial layer is defined as a Z axis, Nx1 is a refractive index of the first biaxial layer in a direction of the X axis, Ny1 is a refractive index of the first biaxial layer in a direction of the Y axis, Nz1 is a refractive index of the first biaxial layer in a direction of the Z axis, and d1 is a thickness of the first biaxial layer, the second predetermined value satisfies the following equation (4):

$$Rth2 = [(Nx2 - Ny2)/2 - Nz2] \times d2 \quad (4)$$

two directions perpendicular to each other on a plane of the second triacetyl cellulose layer are respectively defined as an X axis and a Y-axis, a direction perpendicular to a thickness direction of the second triacetyl cellulose layer is defined as a Z axis, Nx2 is a refractive index of the second triacetyl cellulose layer in a direction of the X axis, Ny1 is a refractive index of the second triacetyl cellulose layer in a direction of the Y axis, Nz1 is a refractive index of the second triacetyl cellulose layer in a direction of the Z axis, and d2 is a thickness of the second triacetyl cellulose layer, a slow axis of the first TAC layer is set as 0 degree, an absorption axis of the first PVA layer is set as 90 degrees, a slow axis of the first biaxial layer is set as 0 degree, a slow axis of the second TAC layer is set as 90 degrees, an absorption axis of the second PVA layer is set as 0 degree, and a slow axis of the third TAC layer is set as 90 degrees.

5. The liquid crystal display of claim 4, wherein when the compensation value Rth1 of the first biaxial layer is selected as the first predetermined value, a compensation value Ro of the first biaxial layer corresponds to the compensation value Rth1 and satisfies the following equation (5):

$$Ro = (Nx1 - Ny1) \times d1 \quad (5)$$

the compensation value Ro is a planar retardation of the first biaxial layer.

6. The liquid crystal display of claim 5, wherein a preferred range of the compensation value Rth1 of the biaxial layer is between 180 nanometers and 280 nanometers.

7. A liquid crystal display, comprising a first polarizer, a liquid crystal layer and a second polarizer, the liquid crystal layer disposed between the first polarizer and the second polarizer, the first polarizer comprising a first triacetyl cellulose layer, a first poly vinyl alcohol layer, a first biaxial layer and a first substrate, the first poly vinyl alcohol layer disposed on the first triacetyl cellulose layer, the first biaxial layer disposed on the first poly vinyl alcohol layer, the first triacetyl cellulose layer, the first poly vinyl alcohol layer and the first biaxial layer fixed to the first substrate, the second polarizer comprising a second substrate, a second triacetyl cellulose layer, a second poly vinyl alcohol layer and a third triacetyl cellulose layer, the second poly vinyl alcohol layer disposed on the second triacetyl cellulose layer, the third triacetyl cellulose layer disposed on the second poly vinyl alcohol layer, the third triacetyl cellulose layer, the second poly vinyl alcohol layer and the second triacetyl cellulose layer fixed to the second substrate, wherein only one biaxial layer is utilized in the liquid crystal display;

wherein when a wavelength is 550 nanometers, a compensation value Rth1 of the biaxial layer and a range [Y1, Y2] of a compensation value Rth2 of the second triacetyl cellulose layer satisfy the following equations (1) and (2);

$$Y1 = -0.002107 \times (Rth1)^2 - 0.01686 \times (Rth1) + 206.5 \quad (1)$$

$$Y2 = -0.006137 \times (Rth1)^2 + 1.703 \times (Rth1) + 75.16 \quad (2)$$

the compensation value Rth1 of the biaxial layer is a thickness-direction plane retardation of the biaxial layer, the compensation value Rth2 of the second triacetyl cellulose layer is a thickness-direction plane retardation of the second triacetyl cellulose layer, Y1 is a minimum value of the compensation value Rth2 of the second triacetyl cellulose layer, and Y2 is a maximum value of the compensation value Rth2 of the second triacetyl cellulose layer, a slow axis of the first TAC layer is set as 0 degree, an absorption axis of the first PVA layer is set as 90 degrees, a slow axis of the first biaxial layer is set as 0 degree, a slow axis of the second TAC layer is set as 90 degrees, an absorption axis of the second PVA layer is set as 0 degree, and a slow axis of the third TAC layer is set as 90 degrees.

8. The liquid crystal display of claim 7, wherein a preferred range of the compensation value Rth1 of the biaxial layer is between 180 nanometers and 280 nanometers.

9. The liquid crystal display of claim 7, wherein a preferred range of a pretilt angle of liquid crystal molecules of the liquid crystal layer is between 85 degrees and 90 degrees.

* * * * *

UNITED STATES PATENT AND TRADEMARK OFFICE
CERTIFICATE OF CORRECTION

| | | |
|---|---|---|
| PATENT NO. | : 9,645,445 B2 | |
| APPLICATION NO. | : 13/813456 | |
| DATED | : May 9, 2017 | |
| INVENTOR(S) | : Chihtsung Kang | |

It is certified that error appears in the above-identified patent and that said Letters Patent is hereby corrected as shown below:

In the Claims

Claim 1, Column 10:
Line 45: Change:
-- set as U degree --
To:
"set as 0 degree"

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*